United States Patent
Hoehl et al.

(10) Patent No.: US 11,803,943 B2
(45) Date of Patent: Oct. 31, 2023

(54) BRIGHTNESS AND CONTRAST CORRECTION FOR VIDEO EXTENSOMETER SYSTEMS AND METHODS

(71) Applicant: Illinois Tool Works Inc., Glenview, IL (US)

(72) Inventors: Christian J. Hoehl, Ober-Ramstadt (DE); Michael Ashman, Natick, MA (US)

(73) Assignee: Illinois Tool Works Inc., Glenview, IL (US)

( * ) Notice: Subject to any disclaimer, the term of this patent is extended or adjusted under 35 U.S.C. 154(b) by 47 days.

(21) Appl. No.: 16/894,065

(22) Filed: Jun. 5, 2020

(65) Prior Publication Data

US 2020/0410648 A1    Dec. 31, 2020

Related U.S. Application Data

(60) Provisional application No. 62/866,391, filed on Jun. 25, 2019.

(51) Int. Cl.
*G06T 5/00* (2006.01)
*G06T 7/246* (2017.01)
(Continued)

(52) U.S. Cl.
CPC .............. *G06T 5/005* (2013.01); *G06T 7/248* (2017.01); *H04N 23/71* (2023.01); *H04N 25/63* (2023.01)

(58) Field of Classification Search
None
See application file for complete search history.

(56) References Cited

U.S. PATENT DOCUMENTS

| | | | | |
|---|---|---|---|---|
| 4,598,420 A | * | 7/1986 | Harvey | G01B 11/165 348/88 |
| 4,690,001 A | * | 9/1987 | Harvey | G01D 5/34 348/294 |

(Continued)

FOREIGN PATENT DOCUMENTS

| | | |
|---|---|---|
| EP | 3289084 | 11/1988 |
| EP | 2503325 | 9/2012 |

(Continued)

OTHER PUBLICATIONS

Nt'l Search Report and Written Opinion Appln No. PCT/US2020/036790 mailed Oct. 28, 2020.

*Primary Examiner* — Guillermo M Rivera-Martinez
(74) *Attorney, Agent, or Firm* — McAndrews, Held & Malloy, Ltd.

(57) ABSTRACT

The present disclosure describes systems and methods to correct for edge-position error associated with brightness levels of an associated back screen in a video extensometer system. In some examples, to correct for edge-position error, a processing system is configured to execute an edge detection algorithm to measure and/or calculate a difference between a perceived edge-position and a reference edge-position associated with an amount of error, and calculate a correction term to address the error. The correction term can be added to the result of the edge detection algorithm in case of white-to black transition, and subtracted in case of black-to-white transition to correct for the error.

17 Claims, 6 Drawing Sheets

(51) Int. Cl.
*H04N 23/71* (2023.01)
*H04N 25/63* (2023.01)

(56) References Cited

U.S. PATENT DOCUMENTS

| | | | | |
|---|---|---|---|---|
| 4,869,110 A | * | 9/1989 | Kent | G01B 11/16 |
| | | | | 73/800 |
| 5,033,096 A | * | 7/1991 | Morrison | G01B 11/046 |
| | | | | 382/152 |
| 5,568,259 A | * | 10/1996 | Kamegawa | G01B 11/16 |
| | | | | 356/32 |
| 5,841,892 A | * | 11/1998 | McGrath | G06T 7/73 |
| | | | | 382/141 |
| 6,006,608 A | * | 12/1999 | Renz | G01B 11/16 |
| | | | | 73/800 |
| 6,094,259 A | * | 7/2000 | Kamegawa | G01B 11/16 |
| | | | | 356/32 |
| 10,551,169 B1 | * | 2/2020 | Womack | G01N 3/62 |
| 2006/0115133 A1 | * | 6/2006 | Potter | G06K 9/3216 |
| | | | | 382/128 |
| 2006/0185440 A1 | * | 8/2006 | Hayford | G01N 21/01 |
| | | | | 73/800 |
| 2007/0121106 A1 | * | 5/2007 | Shibata | G06T 7/001 |
| | | | | 356/237.2 |
| 2009/0225167 A1 | * | 9/2009 | Tsuji | G06T 7/73 |
| | | | | 348/160 |
| 2010/0310128 A1 | * | 12/2010 | Iliopoulos | G01M 5/005 |
| | | | | 382/103 |
| 2012/0243790 A1 | * | 9/2012 | Campbell | G01N 21/8806 |
| | | | | 382/199 |
| 2013/0147919 A1 | * | 6/2013 | Xia | H04N 13/204 |
| | | | | 348/46 |
| 2017/0219468 A1 | * | 8/2017 | Peterson | H04N 7/10 |

FOREIGN PATENT DOCUMENTS

| | | | | |
|---|---|---|---|---|
| FR | 3011929 | | 4/2015 | |
| NO | 2014104983 | | 7/2014 | |
| WO | WO-2014104983 A1 | * | 7/2014 | G01N 3/068 |

* cited by examiner

| | Brightness Score 1 | Brightness Score 2 | Brightness Score 3 |
|---|---|---|---|
| Focus Score 1 | Error₁₁ [px] | Error₁₂ [px] | ... |
| Focus Score 2 | Error₂₁ [px] | Error₂₂ [px] | ... |
| Focus Score ... | ... | ... | ... |

BRIGHTNESS AND CONTRAST CORRECTION FOR VIDEO EXTENSOMETER SYSTEMS AND METHODS

CROSS REFERENCE TO RELATED APPLICATIONS

This application is a Non-Provisional Patent Application which claims priority to U.S. Provisional Patent Application No. 62/866,391, entitled "Brightness And Contrast Correction For Video Extensometer Systems And Methods", filed Jun. 25, 2019, the contents of which are herein incorporated by reference in their entirety.

BACKGROUND

Camera based vision systems have been implemented as part of materials testing systems, for measurement of specimen strain. These systems collect one or more images of a specimen under test, with these images being synchronized with other signals of interest for the test (e.g., specimen load, machine actuator/crosshead displacement etc.). The images of the test specimen can be analyzed to locate and track specific features of the specimen as the test progresses. Changes in the location of such features, such as a width of the specimen, allows local specimen deformation to be calculated and in turn specimen strain to be computed.

Conventional systems employ backlit screens and/or one or more light sources to direct light onto multiple surface and/or sides of the test specimen. However, edge-position error associated with brightness levels of the backlit screen can lead to distorted readings and inaccurate measurements. Thus, a system to correct for such errors is desirable.

SUMMARY

Disclosed herein are systems and methods to correct for edge-position error associated with brightness levels of an associated back screen in a video extensometer system. In disclosed examples, one or more image processing algorithms can be executed to measure a width of the test specimen by identifying the transition edges of the specimen as they appear as a dark silhouette in front of the illuminated back screen. In some examples, to correct for edge-position error, a processing system is configured to execute an edge detection algorithm to measure and/or calculate a difference between a perceived edge-position and a reference edge-position associated with an amount of error, and calculate a correction term to address the error. The correction term can be applied to one or more results of the algorithm to correct for the error. In some examples, the correction term can be added to the result of the edge detection algorithm in case of white-to black transition, and subtracted in case of black-to-white transition to correct for the error These and other features and advantages of the present invention will be apparent from the following detailed description, in conjunction with the appended claims.

In disclosed examples, a system for correcting brightness distortion of a test specimen includes a testing system to secure a test specimen. A screen provides illumination to silhouette the test specimen, be it actively or passively illuminated. An imaging device, such as a video camera, is arranged opposite the screen relative to the test specimen and configured to capture images of the test specimen. A processing system is configured to receive images of the test specimen from the imaging device, measure one or more characteristics at one or more positions along an edge of the test specimen, compare the one or more characteristics to a reference characteristic, determine a corrective term based on the comparison, and apply the corrective term to the one or more characteristics measurements to provide a corrected measurement.

In some examples, the correction term is added to the result of the edge detection algorithm in case of white-to black transition. In some examples, the correction term is subtracted in case of black-to-white transition to correct for the error. In some examples, the correction term is in one of millimeters, inches, or pixel units. In some examples, the one or more characteristics comprises one or more of an edge position or a width of the test specimen.

In some examples, the processor is located with a remote computing platform in communication with one or more of the testing system or the imaging device.

In other disclosed examples, a method for correcting brightness distortion of a test specimen includes arranging a test specimen between an illuminated screen and an imaging device. A processing system accesses a list of correction terms wherein the correction terms are a function of one or more characteristics including brightness and focus. The processing system determines a correction term from the list of correction terms based on one of a predetermined focus or calculated focus of the imaging device. The imaging device images a silhouette of the test specimen against the illuminated screen. The processing system calculates one or more characteristic measurements based on the imaging and applies the corrective term to the one or more characteristic measurements of the test specimen to provide a corrected measurement.

In some examples, the one or more characteristics comprises one or more of an edge position or a width of the test specimen. In some examples, the correction term is in one of millimeters, inches, or pixel units. In some examples, the method corrects for distortions based on contrast in a captured image or a focus of the imaging system. In some examples, the method includes modeling values associated with one or more of brightness, contrast, or focus to determine distortions associated with brightness, contrast, or focus in the captured image; and outputting the corrective term based on the distortions relative to the one or more characteristics.

BRIEF DESCRIPTION OF THE DRAWINGS

The benefits and advantages of the present invention will become more readily apparent to those of ordinary skill in the relevant art after reviewing the following detailed description and accompanying drawings, wherein.

The figures are not necessarily to scale. Where appropriate, similar or identical reference numbers are used to refer to similar or identical components.

DETAILED DESCRIPTION

Figure 2:
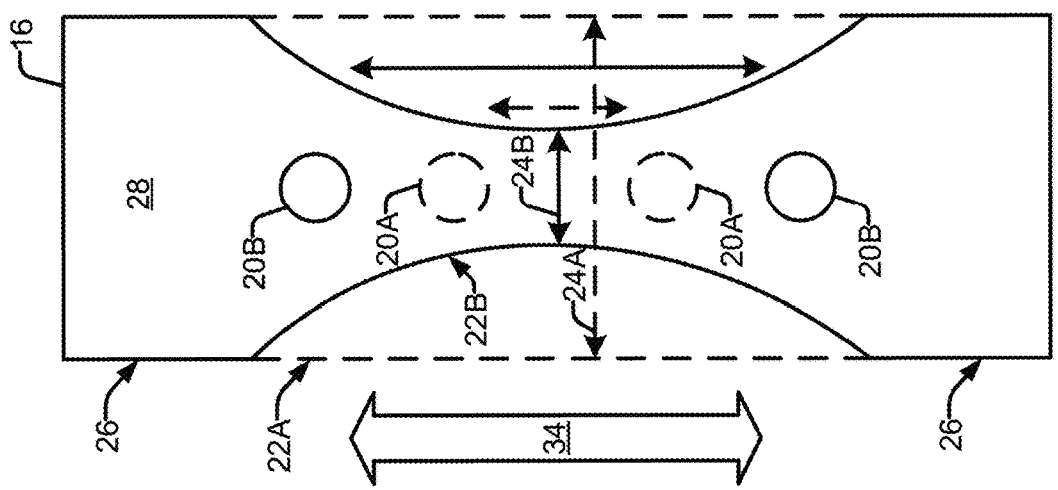
FIG. 2 is an example test specimen for measurement in the extensometer system of FIG. 1, in accordance with aspects of this disclosure.

The present disclosure describes systems and methods to correct for edge-position error associated with brightness levels of an associated back screen in a video extensometer system. In some examples, to correct for edge-position error, a processing system is configured to execute an edge detection algorithm to measure and/or calculate a difference between a perceived edge-position and a reference edge-position associated with an amount of error, and calculate a correction term to address the error. The correction term can be applied to one or more results of the algorithm to correct for the error. In some examples, the correction term can be added to the result of the edge detection algorithm in case of white-to black transition, and subtracted in case of black-to-white transition to correct for the error.

As disclosed herein, a video extensometer system is configured to perform optical width measurement of a test specimen. In some examples, edges of a substantially non-transparent test specimen are measured based on a level of brightness contrast between the test specimen and a back screen. For examples, the test specimen it secured within a testing machine and arranged in front of an illuminated (e.g., an actively or passively lit) back screen. An imaging device is arranged to observe a surface of the test specimen that is facing the camera, the surface being close to a focal plane of the imaging device optics (see, e.g., FIG. 3). With this arrangement, the test specimen is viewed and imaged by the imaging device as a dark silhouetted shape, as it is located in front of a brightly illuminated back screen (see, e.g., FIG. 4).

For example, when arranged between the illuminated back screen and the imaging device, the distinctly focused dark silhouette of the test specimen is stark, and the shape and character of the edges are well defined when imaged in front of illuminated back screen. In some examples, the test specimen is made of a material with greater transparency. Such semi-transparent test specimens may absorb some of the light from the light source, sufficient to provide a measurable level of contrast between the test specimen and the back screen.

However, performing highly accurate measurements can be difficult, as perceived positions of the edge of the test specimen depends on the brightness of the back screen, as well as on the focus of the imaging device.

As disclosed herein, to correct for edge-position error, a processing system is configured to execute an edge detection algorithm to measure and/or calculate a difference between a perceived edge-position and a reference edge-position associated with an amount of error, and calculate a correction term to address the error. For example, the correction term can be applied to one or more results of the algorithm to correct for the error. In some examples, the correction term can be added to the result of the edge detection algorithm in case of white-to black transition, and subtracted in case of black-to-white transition to correct for the error.

As described herein, material testing systems, including material testing systems that apply tension, compression, and/or torsion, include one or more components that incur displacement and/or load bearing to apply and/or measure stresses on a test specimen. In some examples, a video extensometer system is employed in specimen strain testing, which can include one or more of collecting high resolution images, providing the images to an image processor, analyzing the images to identify one or more specimen characteristics corresponding to displacement or strain value, and generating an output corresponding to the characteristics. In a disclosed example, the identified characteristics (such as width) from the one or more collected images are compared against one or more sources, such as a list of threshold values or to an image collected previously (i.e. prior to testing). In some examples, a value of the identified characteristic may be applied to one or more algorithms to generate an output corresponding to displacement or strain value associated with the test specimen.

Video processing that employs extensometers may include an external machine vision imaging device connected to a processing system or computing platform and/or video processing hardware and use software and/or hardware to convert the data from the camera to an electrical signal or having a software interface compatible with the materials testing system.

As disclosed herein, camera based image capture (e.g., vision or video) systems are implemented in materials testing systems for measurement of strain on the test specimen. Such systems collect multiple images of the specimen under test (i.e. during a testing process), with the images being synchronized with other signals of interest for the test (such as specimen load, machine actuator and/or crosshead displacement, etc.). The images of the specimen are analyzed (e.g., in real-time and/or post-test) by algorithms to locate and track specific specimen characteristics as the test progresses. For instance, a change in a location, size, shape, etc., of such characteristics allows for test specimen deformation to be calculated, which leads in turn to analysis and calculation of specimen strain.

Characteristics such as specimen width may be captured via an imaging device, with the captured image transmitted to a processing system. Image analysis can be performed by the extensometer system (e.g. via the processing system) to determine a first or initial position and/or location of the specimen width(s) to track changes in the width(s) as the test progresses.

The image processing algorithms then determine the edges of the specimen and calculate the width of the specimen and track changes in specimen width compared to the initial width at the beginning of the test (i.e. transverse strain).

The processing system is configured to execute an edge detection algorithm to measure and/or calculate a difference between a perceived edge-position (from the captured images) and a reference edge-position associated with an amount of error, and calculate a correction term to address the error. The correction term can be applied to one or more results of the algorithm to correct for the error. In some examples, the correction term can be added to the result of the edge detection algorithm in case of white-to black transition, and subtracted in case of black-to-white transition to correct for the error As described herein, video extensometers that measure the width of the test specimen require controlled background lighting conditions. This is achieved by including a backlight system, be it an active (separately sourced) backlight or a passive backlight (employing reflected light). In the case of a video extensometer that will be used to measure the width of the specimen (transverse specimen edge based strain); there is presently a limitation where brightness levels of the background illumination result in errors for edge detection of a dark specimen silhouette.

Moreover, control of relative brightness levels of the back screen can be achieved by adjustments in the absolute and/or relative component positions, angular orientations of the camera, the light source, test specimen, and/or back screen, and/or adjustment to a power level or other illumination characteristic.

In disclosed examples, a system for correcting brightness, contrast, or focus distortion of a test specimen includes a testing system to secure a test specimen; a screen to provide illumination to silhouette the test specimen; an imaging device arranged opposite the screen relative to the test specimen and configured to capture images of the test specimen; and a processing system. The processing system is to receive images of the test specimen from the imaging device; measure one or more characteristics at one or more positions along an edge of the test specimen during a testing process; and compare the one or more characteristics to a reference characteristic.

In some examples, the correction term is added to the result of the edge detection algorithm in case of white-to-black transition. In examples, the correction term is subtracted in case of black-to-white transition to correct for the error. In some examples, the correction term is in one of millimeters, inches, or pixel units.

In some examples, the one or more characteristics comprises one or more of an edge position or a width of the test specimen. In examples, the edge position is referenced in pixel coordinates and corrected based on a direction of contrast, a level of contrast, or a level of brightness and/or focus of the test specimen relative to the screen.

In some examples, the processor is located with a remote computing platform in communication with one or more of the testing system or the imaging device.

In examples, the processor is integrated with one of the imaging device or the testing system. In some examples, the processor is further configured to determine a corrective term based on the comparison; and apply the corrective term to the one or more characteristics measurements to provide a corrected measurement.

In some disclosed examples, a method for correcting brightness, contrast, or focus distortion of a test specimen is provided. The method includes arranging a test specimen between an illuminated screen and an imaging device; imaging, via the imaging device, a silhouette of the test specimen against the illuminated screen; calculating, via the processing system, one or more characteristic measurements based on the imaging; accessing, via a processing system, a list of correction terms, wherein the correction terms are a function of one or more characteristics including brightness, contrast and focus; and determining, via the processing system, a correction term from the list of correction terms based on one of a brightness, a predetermined focus, or calculated focus of the imaging device;

In some examples, the method includes applying, via the processing system, the corrective term to the one or more characteristic measurements of the test specimen to provide a corrected measurement.

In some examples, the one or more characteristics comprises one or more of an edge position or a width of the test specimen. In examples, the correction term is in one of millimeters, inches, or pixel units. In examples, the method includes correcting for distortions based on contrast in a captured image or a focus of the imaging system.

In some examples, the method includes modeling values associated with one or more of brightness, contrast or focus to determine distortions associated with brightness, contrast, or focus in the captured image; and outputting the corrective term based on the distortions relative to the one or more characteristics.

In some examples, the imaging device is configured to capture polarized light or infrared light reflected from the screen or the test specimen, the screen reflecting light to create a dark silhouette of the test specimen for edge analysis.

In some examples disclosed, a system for correcting brightness distortion of a test specimen is provided. The system includes a processing system to receive images from an imaging device of a test specimen during a testing process, wherein the imaging device is arranged opposite a reflective screen relative to the test specimen; measure one or more characteristics at one or more positions along an edge of the test specimen during the testing process; determine distortions along the edge of the test specimen in the images associated with brightness, contrast, or focus; and determine a corrective term based on the distortions.

In some examples, the processing system outputs the corrective term based on the distortions relative to the one or more characteristics. In examples, the processing system is further configured to apply the corrective term to correct for distortions of the one or more characteristics based on one or more of brightness, contrast, or focus in the images.

In some examples, one or more light sources direct light to a surface of the test specimen and a reflective surface of the screen, wherein the test specimen is arranged between the one or more light sources and the screen.

Figure 1:
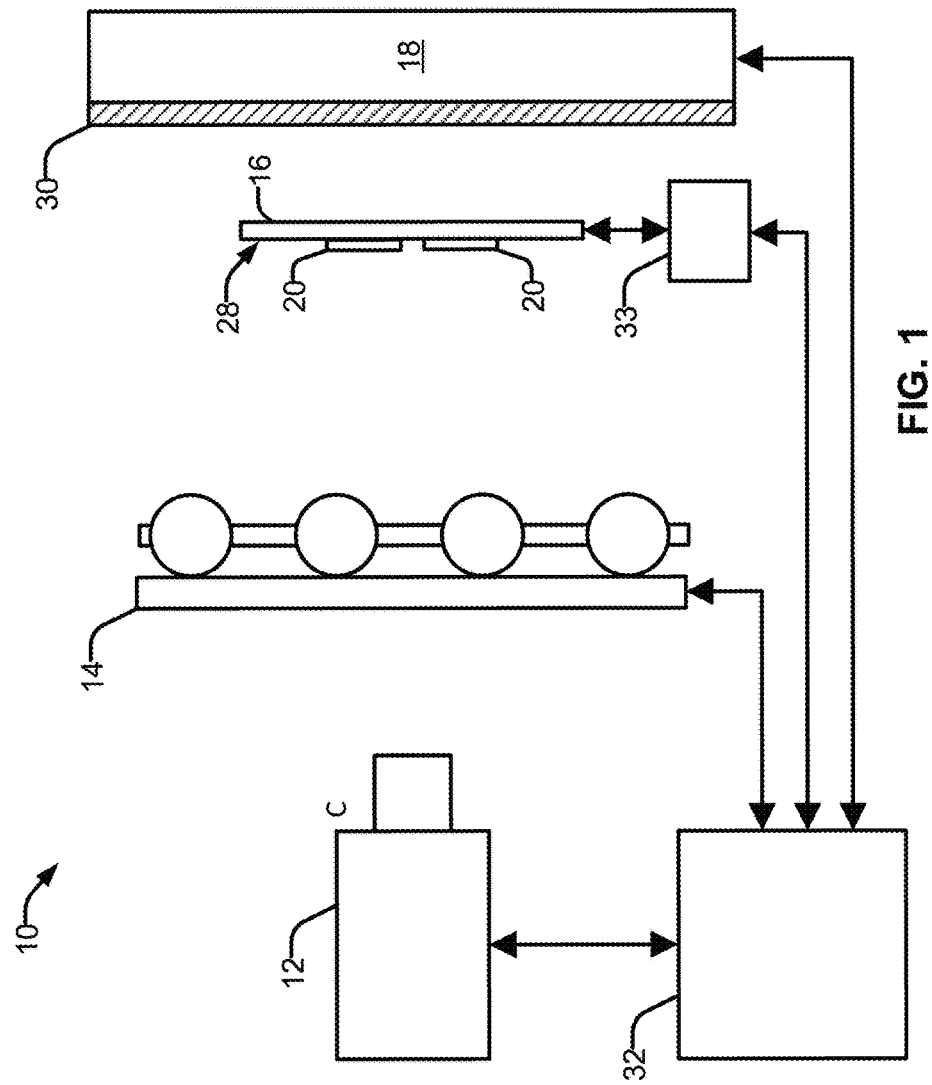
FIG. 1 is a block diagram of an example extensometer system, in accordance with aspects of this disclosure.

Referring now to the figures, FIG. 1 is an example extensometer system 10 to measure changes to one or more characteristics of a test specimen 16 undergoing a mechanical property testing. The example extensometer system 10 may be connected to, for example, a testing system 33 capable of mechanical testing of the test specimen 16. The extensometer system 10 may measure and/or calculate changes in the test specimen 16 subjected to, for example, compression strength testing, tension strength testing, shear strength testing, bend strength testing, deflection strength testing, tearing strength testing, peel strength testing (e.g., strength of an adhesive bond), torsional strength testing, and/or any other compressive and/or tensile testing. Additionally, or alternatively, the material extensometer system 10 may perform dynamic testing.

Figure 8:
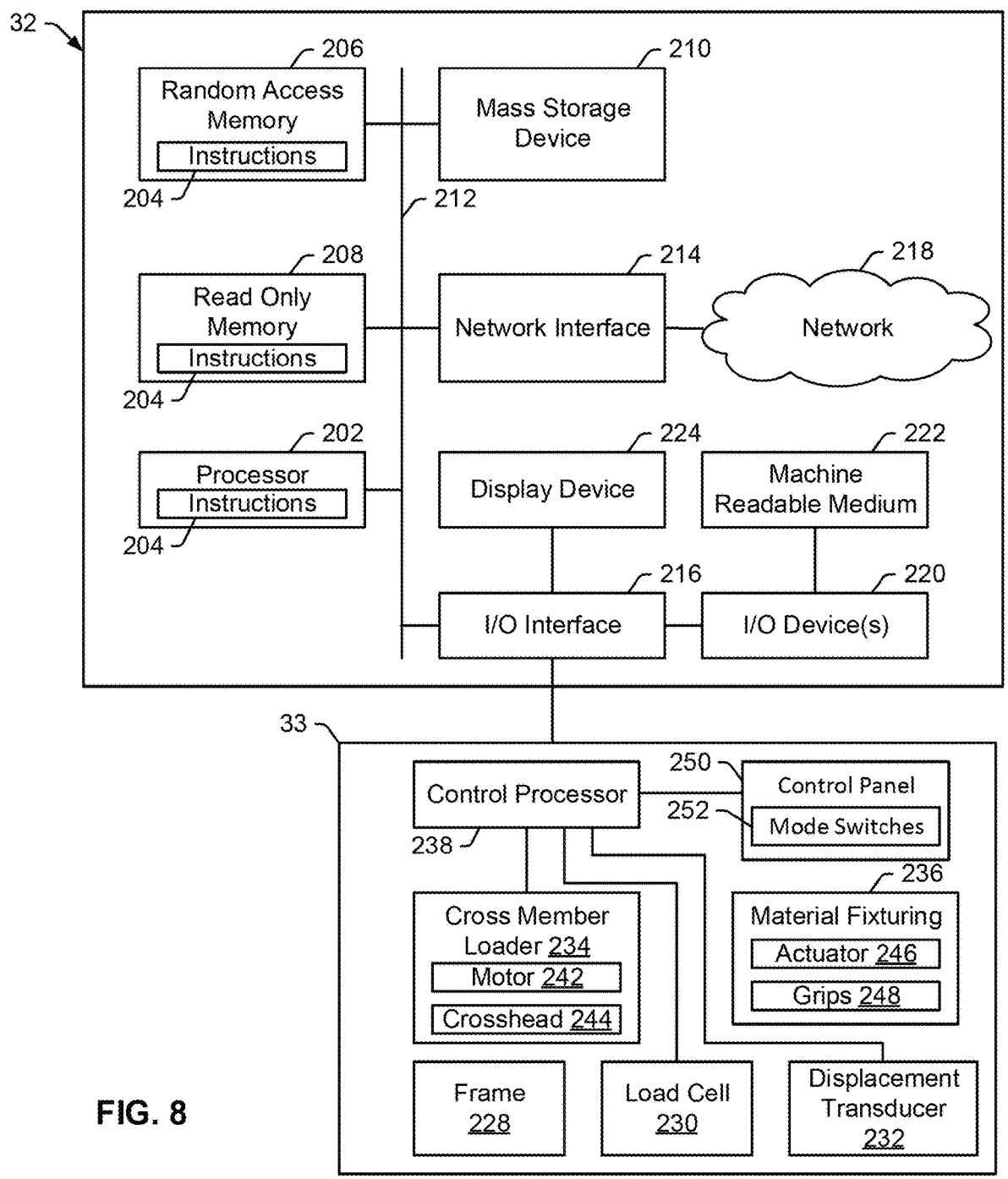
FIG. 8 is a block diagram of an example implementation of the extensometer system of FIG. 1.

In accordance with disclosed examples, the extensometer system 10 may include the testing system 33 for manipulating and testing the test specimen 16, and/or a computing device or processing system 32 communicatively coupled to the testing system 33, the light source, and/or the imaging device, as further shown in FIG. 8. The testing system 33 applies loads to the test specimen 16 and measures the mechanical properties of the test, such as displacement of the test specimen 16 and/or force applied to the test specimen 16.

The extensometer system 10 includes a remote and/or an integral light source 14 (e.g., an LED array) to illuminate the test specimen 16 and/or a reflective back screen 18. The extensometer system 10 includes a processing system 32 (see also FIG. 8) and a camera or imaging device 12. In some examples, the light source 14 and the imaging device 12 are configured to transmit and receive in the infrared (IR) wavelengths; however, other wavelengths are similarly applicable. In some examples, one or both of the light source 14 or the imaging device 12 include one or more filters (e.g., a polarizing filter), one or more lenses. In some examples, a calibration routine is performed (e.g., a two-dimensional calibration routine) to identify one or more characteristics of the test specimen 16, one or more markers 20 (including a pattern of markers), is additionally used.

In some examples, the back screen 18 is configured to reflect light from the light source 14 back to the imaging device 12. For example, a surface of the back screen 18 may be configured with properties to enhance reflection and/or direct reflected light toward the imaging device. Properties can include a shape of the back screen 18 (e.g. in a parabolic configuration), and/or a treatment to increase reflection (e.g., application of cube corner reflectors, a reflective material, etc.). Additionally or alternatively, a filter 30 can be arranged and/or applied to a surface to increase the amount of reflection and/or direct reflected light in a desired direction and/or wavelength. In some examples, the filter 30 is configured as a collimating filter, to provide as much reflected light as possible toward the imaging device 12 and away from other nearby components.

In disclosed examples, the computing device 32 may be used to configure the testing system 33, control the testing system 33, and/or receive measurement data (e.g., transducer measurements such as force and displacement) and/or test results (e.g., peak force, break displacement, etc.) from the testing system 33 for processing, display, reporting, and/or any other desired purposes. The extensometer system 10 connects to the 33 and software utilizing standard interfaces that includes Ethernet, analog, encoder or SPI. This allows the device to be plugged into and used by existing systems without the need for specialized integration software or hardware. The extensometer system 10 provides axial and transverse encoder or analog information in real-time to materials testing machine 33. Real-time video extensometer 10 and materials testing machine 190 exchange real-time test data, including extension/strain data, with the external computer 32, which may be configured via a wired and/or wireless communications channel. The extensometer system 10 provides measurement and/or calculation of extension/strain data captured from the test specimen 16 subjected to testing in the materials testing machine 33, which in turn, provides stress and extension/strain data to the processor 32.

As disclosed herein, the captured images are input to the processor 32 from the imaging device, where one or more algorithms and/or look up tables are employed to calculate multiple axes of extension/strain values for the test specimen 16 (i.e., the change or percentage change in inter-target distance as calculated by image monitoring of the markers 20 affixed to the test specimen 16). Following computation, the data may be stored in memory or output to a network and/or one or more display devices, I/O devices, etc. (see also FIG. 8).

FIG. 2 is an example test specimen 16 for measurement in the extensometer system 10 of FIG. 1. For example, one or more markings are applied to the surface 28 facing the light source 14 and imaging device 12. Grip sections 26 are configured for placement within a grip of the testing system 33 (see also FIG. 8), and apply force to the test specimen 16. For example, a cross-member loader applies force to the specimen 16 under test, while the grips grasp or otherwise couple the test specimen 16 to the testing system 33. A force applicator such as a motor causes the crosshead to move with respect to the frame to apply force to the test specimen 16, as illustrated by double arrow 34. Forces 34 pulling the grip sections 26 away from one another may elongate the test specimen 16, resulting in the markings moving from a first position 20A to a second position 20B. Additionally or alternatively, the markings may change shape or size, which may also be measured by the processing system 32 in view of the captured images. The forces 34 may also cause the edges of the test specimen to move from a first position 22A to a second position 22B. For example, at the first or initial position, the edges have a width 24A, which is reduced to width 24B upon application of the forces 34.

Based on the captured images, the processing system 33 is configured to implement an extension/strain on measurement process. For example, to detect an extension/strain on the test specimen 16, the processing system 33 monitors the images provided via the imaging device 12. When the processing system 33 identifies a change in relative position between two or more of the markers and/or the edges of the test specimen 16 (e.g., compared to an initial location at a beginning of movement of the crosshead), the processing system 33 measures the amount of change to calculate the amount of extension and/or strain on the test specimen 16. As disclosed herein, the markers are configured to reflect light from the light source to the camera, whereas the back screen reflects light to create a dark silhouette for edge analysis.

As disclosed herein, the video extensometer system 10 is configured to perform optical width measurement of non-transparent test specimen 16. The imaging device 12 is arranged to observe the surface 28 of the test specimen 16 that is facing the imaging device 12, the surface 28 being close to a focal plane of the imaging device optics (see, e.g., FIG. 3). With this arrangement, the test specimen 16 is viewed and imaged by the imaging device 12 as a dark silhouetted shape, as it is located in front of the brightly illuminated back screen 18.

For example, when arranged between the illuminated back screen 18 and the imaging device 12, the distinctly focused dark silhouette of the test specimen 16 is stark, and the shape and character of the edges 22 are well defined when imaged in front of illuminated back screen 18. However, performing highly accurate measurements can be difficult, as the perceived position of the edges 22 of the test specimen 16 depends on the brightness of the back screen 18, as well as on the focus of the imaging device 12.

As disclosed herein, to correct for edge-position error, the processing system 32 is configured to execute an edge detection algorithm to measure and/or calculate a difference between a perceived edge-position and a reference edge-position associated with an amount of error, and calculate a correction term to address the error. For example, the correction term is applied to one or more results of the algorithm to correct for the error. In some examples, the correction term can be added to the result of the edge detection algorithm in case of white-to black transition, and subtracted in case of black-to-white transition to correct for the error.

Figure 3:
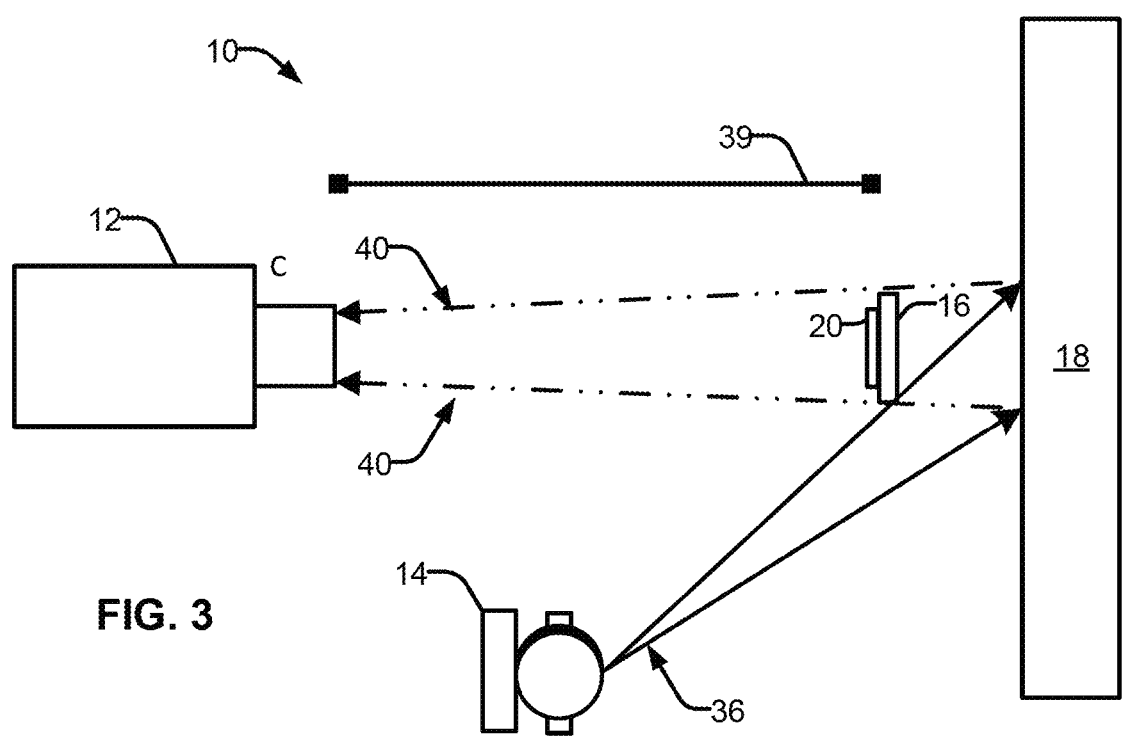
FIG. 3 is a block diagram of an alternate view of the example extensometer system of FIG. 1, in accordance with aspects of this disclosure.

FIG. 3 shows an arrangement for a video extensometer system 10 to measure one or both of axial strain (based on changes in markers 20 and/or a pattern of markers on the test specimen 16 front surface 28), and transverse strain (calculated from changes in width of the specimen 16). The components of the video extensometer system 10 are shown in a top perspective in FIG. 3B, with general locations of each component relative to the others. As shown, the components include an imaging device 12 (e.g., a video camera) configured to capture one or more images of the test specimen 16 during the physical test (e.g., at regular intervals, continuously, and/or based on one or more threshold values associated with time, force, or other suitable test characteristic).

One or more light sources 14 emit light 36 to illuminate a surface 28 of the test specimen 16 and a screen 18 that is arranged facing a rear surface of the test specimen 16 opposite the light source 14. In some examples, the light source(s) 14 are arranged to direct light off-axis (e.g., in an upwards, sideways, and/or downwards direction shown from a top elevation in view of FIG. 3), and angled to illuminate the front surface 28 of the test specimen 16 and/or the back screen 18.

As shown, a passive (i.e. lacking active illumination source) back screen 18 is arranged to the rear of the test specimen 16, designed with reflective properties and of a size suitable to present a uniformly bright background to the video extensometer imaging device 12. As shown in FIG. 3, light 36 incident on back screen 18 is reflected back as light 40 directed toward imaging device 12. In some examples, an actively illuminated back screen is used, the brightness level of which can be adjusted by the processing system 32. As shown, the imaging device 12 and test specimen 16 are arranged at a focal distance 39, which during the testing process may be static, predetermined, and/or changing. The light from the back screen 18 creates a darkened silhouette of the test specimen 16, allowing the imaging device 12 to capture images of the edges 22, and changes thereof, during the testing process.

The test specimen 16 located between the imaging device 12 and the back screen 18. The test specimen 16 features suitable marks 20 on the front facing surface 28 of the test specimen 16. Analysis of the one or more images associated with the video extensometer system 10 is implemented via processing system 32 to perform identification algorithms that allow both the test specimen 16 markings 20 and the test specimen edges 22 to be continuously tracked and measured during the test process.

Figure 5:
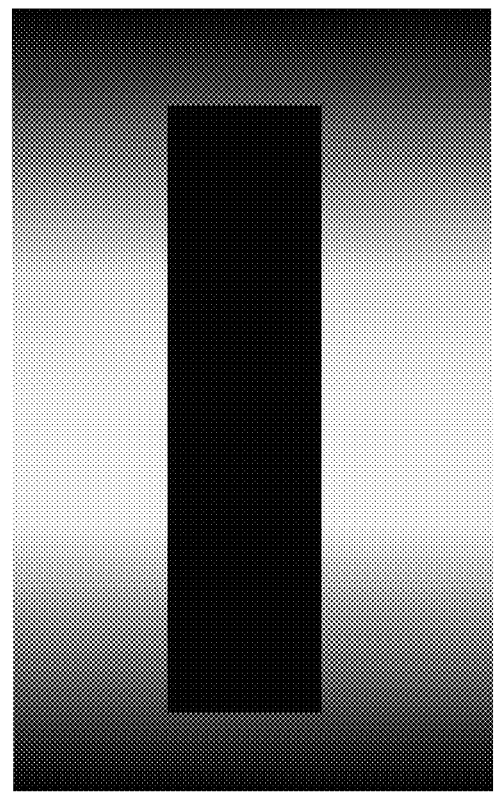
FIG. 5 illustrates an example image of a specimen subjected to optical effects of a shaded background.
Figure 4:
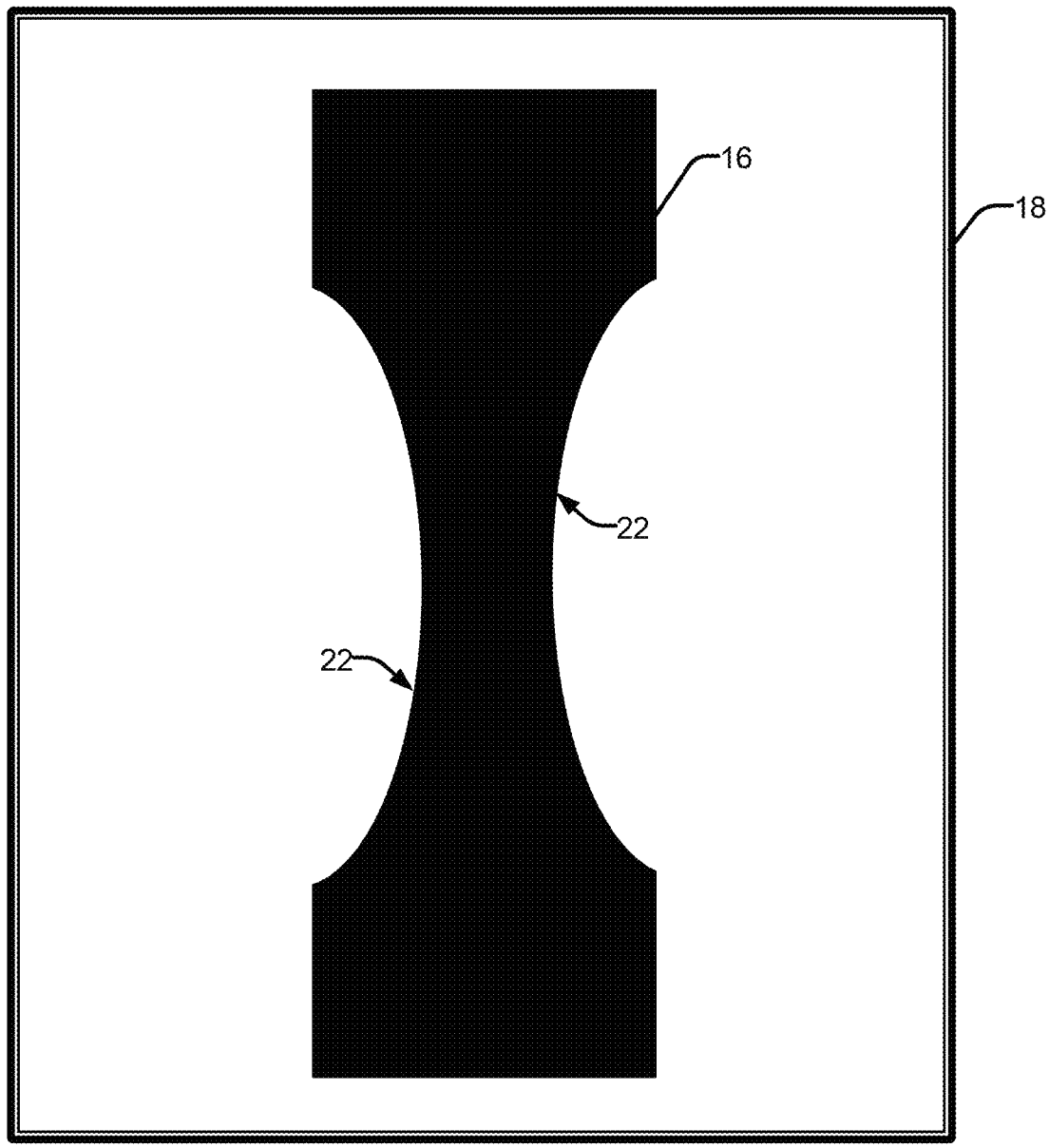
FIG. 4 illustrates a captured image of a test specimen, in accordance with aspects of this disclosure.

FIG. 4 illustrates a captured image of a test specimen 16. As shown, the distinctly focused dark silhouette of test specimen 16 is stark, and the shape and character of the edges 22 are well defined when imaged in front of illuminated back screen 18. The brightness of the background in FIG. 4 is shown as substantially evenly distributed. However, for a background of variable brightness, a more brightly illuminated background makes the edges appear closer to dark areas relative to less brightly illuminated areas of the background. As illustrated in FIG. 5, a rectangular specimen is arranged on a background where brightness varies from the center outwards. Thus, as illustrated, brighter portions of the background make the specimen appear thinner. This phenomenon holds even if the test system is carefully calibrated. The resulting edge-position error is therefore defined as a difference between perceived edge-position and reference edge-position in pixel units for white-to-black transition.

In order to achieve highly accurate measurements, a correction term can be calculated and applied, to correct for error between a perceived position of the edge of the test specimen depends on the brightness of the back screen, as well as on the focus of the imaging device.

Figures 6, 7:
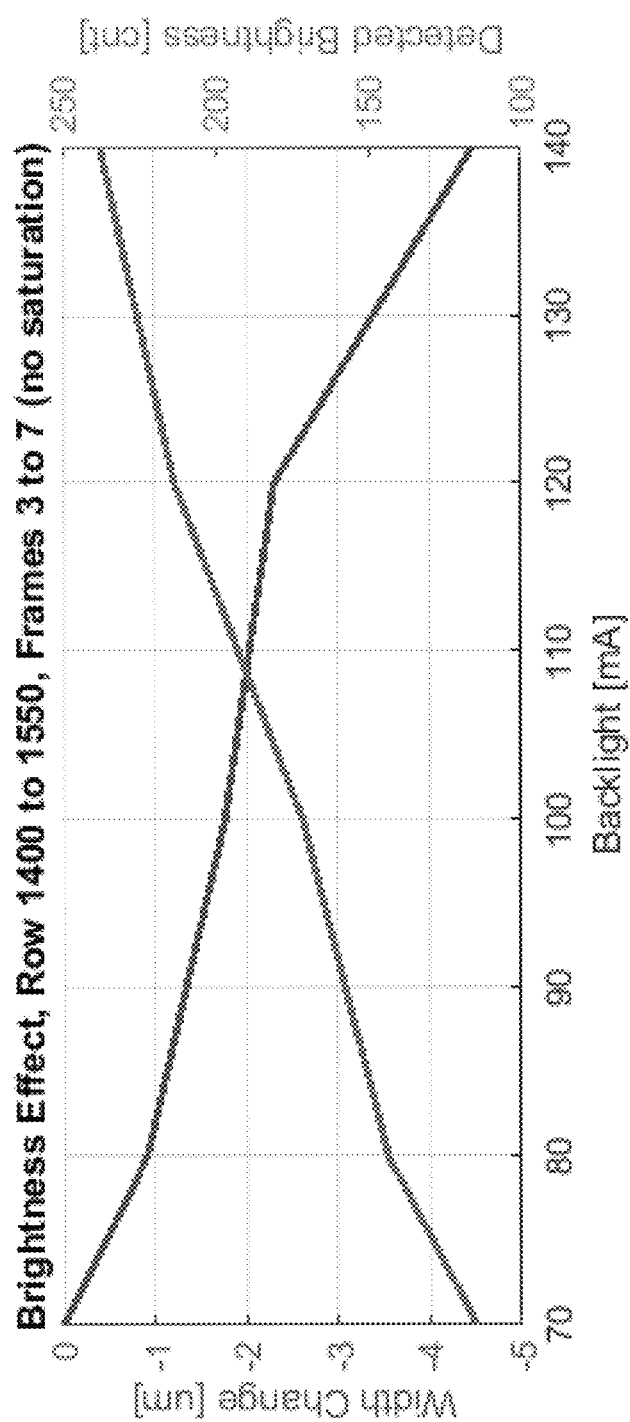
FIG. 6 illustrates an example graph of relating perceived specimen width to brightness, in accordance with aspects of this disclosure.
FIG. 7 is a look up table, in accordance with aspects of this disclosure.

A graph is shown in FIG. 6, associating a perceived change in the width of a test specimen with the width measured at a reference brightness. For example, an error associated with width measurement may correspond to one or both of the level of brightness of the back screen, and a level of sensitivity of an edge detection algorithm with respect to the brightness of the back screen. Such errors may result in an aggregated contribution error, such as during a testing process where width is imaged and recorded multiple times over a given time period during which the brightness of the back screen changes. In some examples, the test specimen is controlled to move in axial direction (e.g. the test system moves the test specimen vertically) in an area where the back screen is illuminated at varying levels over the axil movement.

As disclosed herein, to correct for edge-position error, the processing system 32 is configured to execute an edge detection algorithm to measure and/or calculate a difference between a perceived edge-position and a reference edge-position associated with an amount of error, and calculate a correction term to address the error. For example, the correction term is applied to one or more results of the algorithm to correct for the error. In some examples, the correction term can be added to the result of the edge detection algorithm in case of white-to black transition, and subtracted in case of black-to-white transition to correct for the error.

In some examples, the result of the edge detection algorithm may correspond to one or more corrective actions, such as a command to control adjustment of the brightness level of the back screen, a focus of the imaging device, a position of one or more components, for instance.

In correcting for brightness errors, the extensometer system 10 may calibrate the imaging device 12, such that the width of the test specimen can be determined as the width of the shadow cast by the test specimen 16 onto a sensor of the imaging device 12 (e.g., a photodiode, etc.). An edge is defined as the region of the image where the dark silhouette ends and the bright background appears. An edge detection algorithm can be executed to determine a position of the test specimen edge to sub-pixel accuracy.

Based on the determined a position and/or character of one or more edges of the test specimen, the processing system 32 executes an edge detection algorithm to measure and/or calculate a difference between a perceived edge-position (e.g., what is captured by the imaging device 12) and a reference edge-position associated with an amount of error (e.g., what is expected from test specimen measurements), and calculate a correction term to address the error. For example, to correct for edge-position error, the correction term can be applied to one or more results of the algorithm to correct for the error. In some examples, the correction term can be added to the width determined from the edge detection algorithm in case of white-to black transition, and subtracted in case of black-to-white transition to correct for the error. For instance, the edge position, referenced in pixel coordinates, is corrected based on a direction of contrast, a level of contrast, or a level of brightness and/or focus. In some examples, the measurements and/or position of the one or more edges are provided in pixel coordinates, as captured by the imaging device 12. Additionally or alternatively, the measurements and/or position of the one or more edges are provided in other standard coordinate systems/units, such as meters. In such an example, a calibration process can be implemented to determine absolute and/or relative placement and/or dimensions of the test specimen within the test system prior to measurement. Moreover, width measurement may be employed to determine error, such as when one or more relevant parameters (e.g., contrast, focus, etc.) are available and captured for both edges of the test specimen (e.g., to perform a comparison of edge characteristics).

When performing highly accurate measurements, a perceived position of the edge depends on brightness of background, as illustrated with respect to FIG. 5, as well as on focus of the camera. The error associated with background brightness, however, is well defined for a known focus and for known background brightness. Thus, a listing of values can be generated that contains the edge-position error for relevant focus and background brightness configurations. In the example of FIG. 7, the listing may store the values as a two-dimensional lookup table.

The listing may contain adjusted correction terms (e.g., additive, subtractive, multipliers, etc.), for given brightness scores and/or given focus scores (e.g., in standard or relative units, including an algorithm generated integer(s)), for example. The correction terms can be generated as a function of one or more characteristics, including brightness and focus, as well as other values relating to image distortion. In some examples, the correction term may be calculated to the edge-position error multiplied by minus one (−1).

During a measurement and/or testing process, the processing system 32 is configured to generate an edge detection brightness score and/or a focus score. Based on the results, an associated correction term can be determined by accessing the two-dimensional lookup table. Typically, linear interpolation (and/or extrapolation) would be used to determine correction terms not explicitly listed in that table. As disclosed herein, the correction term would then be added to the result of edge detection algorithm in case of white-to black transition, and it would be subtracted in case of black-to-white transition. Additionally or alternatively, the correction term can be calculated in real-time (e.g., during a measurement process, a testing process, a calibration process, etc.) based on a model (e.g., an algorithm) and/or an analytic description of the process. Model parameters (e.g., proportionality factors) can be employed, which may be hard-coded and applied as needed. For example, values associated with focus, contrast, and/or brightness could be input to the model or could be hard-coded.

In some examples, measures of one or both of brightness and focus may be known in advance. In this example, the test specimen 16 may remain in the same optical plane during measurement and/or the testing process. The associated focus score can be determined in advance and applied prior to measurements. Additionally or alternatively, the lookup table can be simplified to a one-dimensional lookup table. In other words, the one-dimensional lookup table contains correction terms for different brightness scores for the per-determined focus score. In some examples, a listing or matrix of predetermined focus scores can be generated by the processing system, stored in memory, and accessed and applied for the corresponding testing process.

An example application that would benefit from use of the discloses systems and methods would be R-value measurement in materials testing, where the test specimen moves relative to a background with non-homogeneous brightness (as illustrated in FIG. 5) and width-change is being recorded.

FIG. 8 is a block diagram of an example extensometer system 10 of FIG. 1. As shown in FIG. 1, the extensometer system 10 includes the testing system 33 and the computing device 32. The example computing device 32 may be a general-purpose computer, a laptop computer, a tablet computer, a mobile device, a server, an all-in-one computer, and/or any other type of computing device. The computing device 32 of FIG. 8 includes a processor 202, which may be a general-purpose central processing unit (CPU). In some examples, the processor 202 may include one or more specialized processing units, such as FPGA, RISC processors with an ARM core, graphic processing units, digital signal processors, and/or system-on-chips (SoC). The processor 202 executes machine-readable instructions 204 that may be stored locally at the processor (e.g., in an included cache or SoC), in a random access memory 206 (or other volatile memory), in a read-only memory 208 (or other non-volatile memory such as FLASH memory), and/or in a mass storage device 210. The example mass storage device 210 may be a hard drive, a solid-state storage drive, a hybrid drive, a RAID array, and/or any other mass data storage device. A bus 212 enables communications between the processor 202, the RAM 206, the ROM 208, the mass storage device 210, a network interface 214, and/or an input/output interface 216.

An example network interface 214 includes hardware, firmware, and/or software to connect the computing device 201 to a communications network 218 such as the Internet. For example, the network interface 214 may include IEEE 202.X-compliant wireless and/or wired communications hardware for transmitting and/or receiving communications.

An example I/O interface 216 of FIG. 8 includes hardware, firmware, and/or software to connect one or more input/output devices 220 to the processor 202 for providing input to the processor 202 and/or providing output from the processor 202. For example, the I/O interface 216 may include a graphics-processing unit for interfacing with a display device, a universal serial bus port for interfacing with one or more USB-compliant devices, a FireWire, a field bus, and/or any other type of interface. The example extensometer system 10 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The computing device 32 may access a non-transitory machine-readable medium 222 via the I/O interface 216 and/or the I/O device(s) 220. Examples of the machine-readable medium 222 of FIG. 8 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine-readable media.

The extensometer system 10 further includes the testing system 33 coupled to the computing device 32. In the example of FIG. 8, the testing system 33 is coupled to the computing device via the I/O interface 216, such as via a USB port, a Thunderbolt port, a FireWire (IEEE 1394) port, and/or any other type serial or parallel data port. In some examples, the testing system 33 is coupled to the network interface 214 and/or to the I/O interface 216 via a wired or wireless connection (e.g., Ethernet, Wi-Fi, etc.), either directly or via the network 218.

The testing system 33 includes a frame 228, a load cell 230, a displacement transducer 232, a cross-member loader 234, material fixtures 236, and a control processor 238. The frame 228 provides rigid structural support for the other components of the testing system 33 that perform the test. The load cell 230 measures force applied to a material under test by the cross-member loader 234 via the grips 236. The cross-member loader 234 applies force to the material under test, while the material fixtures 236 (also referred to as grips) grasp or otherwise couple the material under test to the cross-member loader 234. The example cross-member loader 234 includes a motor 242 (or other actuator) and a crosshead 244. As used herein, a "crosshead" refers to a component of a material testing system that applies directional (axial) and/or rotational force to a specimen. A material testing system may have one or more crossheads, and the crosshead(s) may be located in any appropriate position and/or orientation in the material testing system. The crosshead 244 couples the material fixtures 236 to the frame 228, and the motor 242 causes the crosshead to move with respect to the frame to position the material fixtures 236 and/or to apply force to the material under test. Example actuators that may be used to provide force and/or motion of a component of the extensometer system 10 include electric motors, pneumatic actuators, hydraulic actuators, piezoelectric actuators, relays, and/or switches.

While the example testing system 33 uses a motor 242, such as a servo or direct-drive linear motor, other systems may use different types of actuators. For example, hydraulic actuators, pneumatic actuators, and/or any other type of actuator may be used based on the requirements of the system.

Example grips 236 include compression platens, jaws or other types of fixtures, depending on the mechanical property being tested and/or the material under test. The grips 236 may be manually configured, controlled via manual input, and/or automatically controlled by the control processor 238. The crosshead 244 and the grips 236 are operator-accessible components.

The extensometer system 10 may further include one or more control panels 250, including one or more mode switches 252. The mode switches 252 may include buttons, switches, and/or other input devices located on an operator control panel. For example, the mode switches 252 may include buttons that control the motor 242 to jog (e.g., position) the crosshead 244 at a particular position on the frame 228, switches (e.g., foot switches) that control the grip actuators 246 to close or open the pneumatic grips 248, and/or any other input devices to control operation of the testing system 33.

The example control processor 238 communicates with the computing device 32 to, for example, receive test parameters from the computing device 32 and/or report measurements and/or other results to the computing device 32. For example, the control processor 238 may include one or more communication or I/O interfaces to enable communication with the computing device 32. The control processor 238 may control the cross-member loader 234 to increase or decrease applied force, control the fixture(s) 236 to grasp or release a material under test, and/or receive measurements from the displacement transducer 232, the load cell 230 and/or other transducers.

The example control processor 238 is configured to implement an extension/strain measurement process when a test specimen 16 is subjected to testing in the testing system 33. For example, to detect an extension/strain on the test specimen 16, the control processor 238 monitors the images provided via the imaging device 12. When the control processor 238 identifies a change in location and/or position of the edges 22 of the test specimen 16 (e.g., compared to an initial location at a beginning of movement of the crosshead 244), the control processor 238 measures the amount of change to calculate the amount of extension and/or strain on the test specimen 16. For example, real-time video provided by the imaging device 12 captures the absolute position of edges 22, and monitors their relative movement over the course of the several images to calculate extension/strain in real time. The stress data and the strain data exchanged among the real-time video extensometer 10, the testing system 33 and the processing system 32, and typically organized and displayed via the display device 224.

Figure 9:
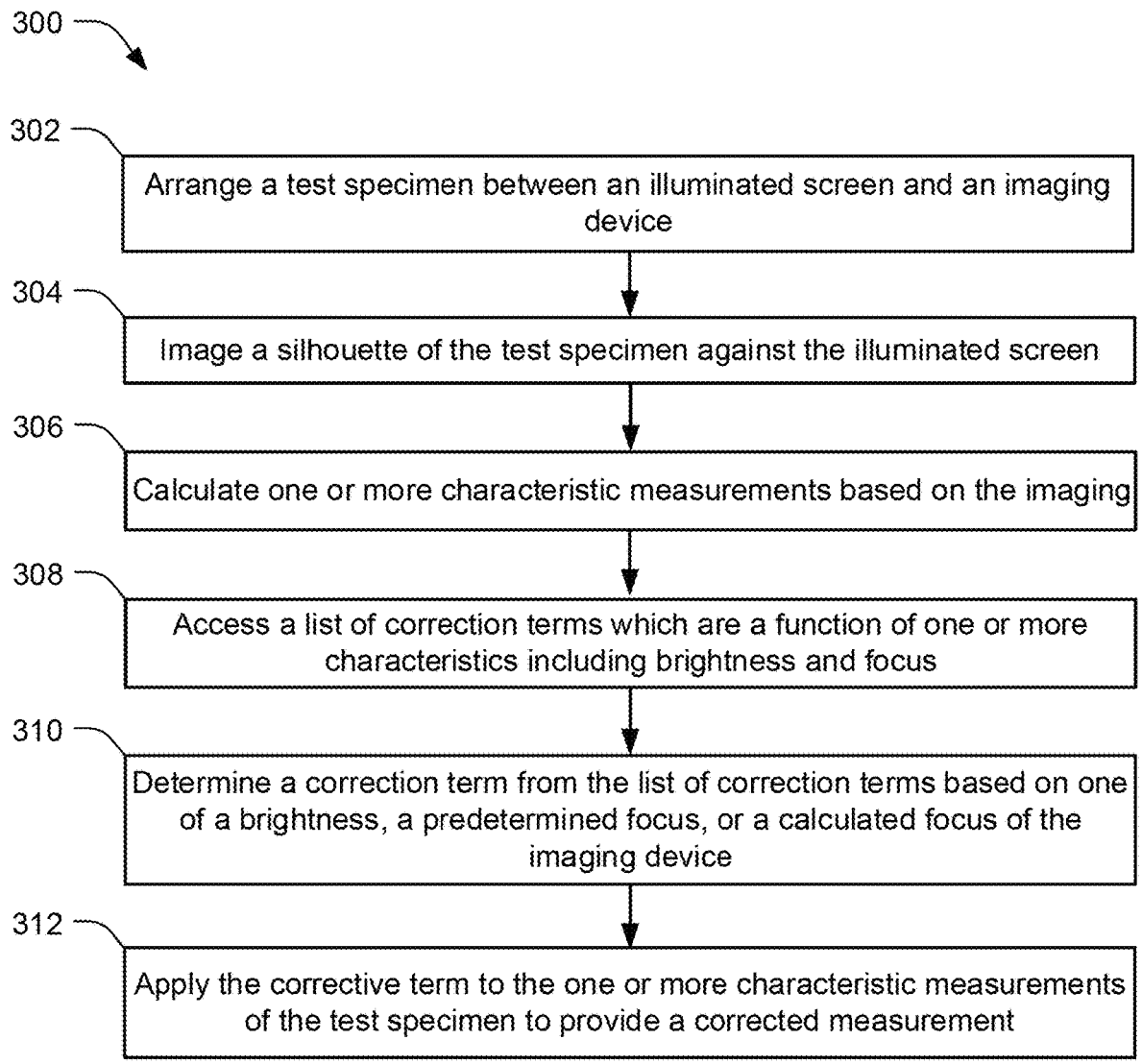
FIG. 9 shows a flowchart representative of example machine-readable instructions to correct for brightness distortion of a test specimen in an extensometer system, in accordance with aspects of this disclosure.

FIG. 9 shows a flowchart representative of example machine readable instructions 300 which may be executed by the processing system 32 of FIGS. 1 and 8 to correct for brightness distortion of a test specimen in an extensometer system. At block 302, a test specimen is arranged between an illuminated screen and an imaging device. At block 304, the imaging device 12 images a silhouette of the test specimen against the illuminated screen. At block 306, the processing system 32 calculates one or more characteristics measurements based on the imaging. At block 308, the processing system 32 accesses a list of correction terms, wherein the correction terms are a function of one or more characteristics including brightness and focus. At block 310, the processing system 32 determines a correction term from the list of correction terms based on a brightness, a predetermined focus, or calculated focus of the imaging device. In addition, at block 312 the processing system 32 applies the corrective term to the one or more characteristics measurements of the test specimen to provide a corrected measurement.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer-readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine-readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A system for correcting brightness, contrast, or focus distortion of a test specimen comprising:
    a testing system to secure the test specimen;
    a screen to provide illumination to silhouette the test specimen;
    an imaging device arranged opposite the screen relative to the test specimen and configured to capture images of the test specimen; and
    a processing system to:
    receive the images of the test specimen from the imaging device;
    measure one or more characteristics at one or more positions along an edge of the test specimen based on the images from the imaging device during a testing process;
    compare the one or more characteristics to a reference characteristic;
    determine a correction term based on the comparison, a given brightness score for the screen relative to a level of brightness of the test specimen obtained from the images from the imaging device, and a given focus score of the test specimen based on a level of focus of the test specimen relative to the screen obtained from the images of the imaging device; and
    apply the correction term to the measure of the one or more characteristics to provide a corrected measurement.

2. The system of claim 1, wherein the correction term is in one of millimeters, inches, or pixel units.

3. The system of claim 1, wherein the one or more characteristics comprises one or more of an edge position or a width of the test specimen.

4. The system of claim 3, wherein the edge position is referenced in pixel coordinates and corrected based on a direction of contrast, a level of contrast, or the level of brightness and/or the level of focus of the test specimen relative to the screen.

5. The system of claim 1, wherein the processor is located with a remote computing platform in communication with one or more of the testing system or the imaging device.

6. The system of claim 1, wherein the processor is integrated with one of the imaging device or the testing system.

7. A method for correcting brightness, contrast, or focus distortion of a test specimen, the method comprising:
    arranging the test specimen between an illuminated screen and an imaging device;
    imaging, via the imaging device, a silhouette of the test specimen against the illuminated screen;
    calculating, via the processing system, one or more characteristic measurements based on the imaging;
    accessing, via a processing system, a list of correction terms, wherein the correction terms are a function of one or more characteristics including brightness, contrast and focus; and
    determining, via the processing system, a correction term from the list of correction terms based on a known level of brightness of the illuminated screen and one of a known focus of the imaging device, or a calculated focus of the imaging device.

8. The method of claim 7, further comprising applying, via the processing system, the correction term to the one or more characteristic measurements of the test specimen to provide a corrected measurement.

9. The method of claim 7, wherein the one or more characteristics comprises one or more of an edge position or a width of the test specimen.

10. The method of claim 7, wherein the correction term is in one of millimeters, inches, or pixel units.

11. The method of claim 7, further comprising correcting for distortions based on contrast in a captured image or a focus of the imaging system.

12. The method of claim 11, further comprising:
    modeling values associated with one or more of brightness, contrast or focus to determine distortions associated with brightness, contrast, or focus in the captured image; and
    outputting the correction term based on the distortions relative to the one or more characteristics.

13. The method of claim 7, wherein the imaging device is configured to capture polarized light or infrared light reflected from the screen or the test specimen, wherein the screen reflects light to create a dark silhouette of the test specimen for edge analysis.

14. A system for correcting brightness distortion of a test specimen comprising a processing system configured to:
    receive images from an imaging device of the test specimen during a testing process, wherein the imaging device is arranged opposite a reflective screen relative to the test specimen;
    measure one or more characteristics at one or more positions along an edge of the test specimen based on the images from the imaging device during the testing process;
    determine distortions along the edge of the test specimen in the images associated with brightness, contrast, or focus; and
    determine a corrective term based on the distortions, a given brightness score of the reflective screen relative to a level of brightness of the test specimen obtained from the images from the imaging device, and a given focus score of the test specimen based on a level of focus of the test specimen relative to the reflective screen obtained from the images of the imaging device.

15. The system of claim 14, wherein the processing system is further configured to output the corrective term based on the distortions relative to the one or more characteristics.

16. The system of claim 15, wherein the processing system is further configured to apply the corrective term to correct for distortions of the one or more characteristics based on one or more of the level of brightness, contrast, or the level of focus in the images.

17. The system of claim 14, wherein one or more light sources direct light to a surface of the test specimen and a reflective surface of the screen, wherein the test specimen is arranged between the one or more light sources and the screen.

\* \* \* \* \*